US010318140B2

(12) United States Patent
Hurley et al.

(10) Patent No.: US 10,318,140 B2
(45) **Date of Patent: *Jun. 11, 2019**

(54) THIRD PART ACTION TRIGGERS

(71) Applicant: Google LLC, Mountain View, CA (US)

(72) Inventors: Fergus Gerard Hurley, San Francisco, CA (US); Robin Dua, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,101

(22) Filed: Oct. 3, 2018

(65) Prior Publication Data

US 2019/0034068 A1 Jan. 31, 2019

Related U.S. Application Data

(63) Continuation of application No. 16/020,616, filed on Jun. 27, 2018, now Pat. No. 10,120,554, which is a (Continued)

(51) Int. Cl.

| | |
|---|---|
| ***G06K 9/00*** | (2006.01) |
| ***H04W 4/02*** | (2018.01) |
| ***G06Q 10/10*** | (2012.01) |
| ***G06Q 40/04*** | (2012.01) |
| ***G06Q 40/06*** | (2012.01) |
| ***H04L 12/58*** | (2006.01) |

(Continued)

(52) U.S. Cl.

CPC ........ *G06F 3/04847* (2013.01); *G06F 3/0482* (2013.01); *G06K 9/00456* (2013.01); *G06Q 10/10* (2013.01); *G06Q 40/04* (2013.01); *G06Q 40/06* (2013.01); *H04L 51/04* (2013.01); *H04L 67/20* (2013.01); *H04W 4/02* (2013.01); *H04W 4/025* (2013.01); *H04W 68/005* (2013.01)

(58) Field of Classification Search

CPC .............. G06F 3/0482; G06F 3/04847; G06K 9/00456; G06Q 10/10; G06Q 40/04; G06Q 40/06; H04L 51/04; H04L 67/20; H04W 4/02; H04W 4/025; H04W 68/005

See application file for complete search history.

(56) References Cited

U.S. PATENT DOCUMENTS 6,654,025 B1 11/2003 Kaczowka
7,334,000 B2 2/2008 Chhatrapati et al.

(Continued)

OTHER PUBLICATIONS

International Search Report and Written Opinion in International Application No. PCT/US2016/032847, dated Jul. 21, 2016, 12 pages.

*Primary Examiner* — Babar Sarwar

(74) *Attorney, Agent, or Firm* — Fish & Richardson P.C.

(57) ABSTRACT

Methods, systems, and apparatus, for providing notifications based on third party data. In an aspect, a method includes receiving first instructions that cause a user device to render a resource that includes a first parameter value of a first parameter and display the resource and generating second instructions that cause the user device to display an action trigger prompt that is rendered with the resource and in an initial state, and wherein the action trigger prompt is rendered to augment the resource with additional content not provided by rendering of the resource according to the first instructions.

13 Claims, 9 Drawing Sheets

300

Provide a resource and instructions that cause user device to display action trigger prompt in initial state — 302

Provide instructions that render the resources at the user device — 304

Receive a selection of the action trigger prompt — 306

Provide instructions to display an action trigger menu that includes input for a user defined event — 308

Receive input of the first parameter of the user defined event in the action trigger menu — 310

Receive a value input as a second parameter value for the first parameter of the user defined event — 312

Related U.S. Application Data continuation of application No. 15/264,023, filed on Sep. 13, 2016, now Pat. No. 10,037,133, which is a continuation of application No. 15/197,301, filed on Jun. 29, 2016, now Pat. No. 9,474,043, which is a continuation of application No. 14/752,369, filed on Jun. 26, 2015, now Pat. No. 9,408,182.

(60) Provisional application No. 62/167,726, filed on May 28, 2015.

(51) Int. Cl.

| | |
|---|---|
| ***H04L 29/08*** | (2006.01) |
| ***H04W 68/00*** | (2009.01) |
| ***G06F 3/0482*** | (2013.01) |
| ***G06F 3/0484*** | (2013.01) |

(56) References Cited

U.S. PATENT DOCUMENTS 8,751,602 B1* 6/2014 Slonh .................. G06F 17/3089 709/204
8,766,793 B2 7/2014 Elumalai et al.
2004/0019603 A1* 1/2004 Haigh .................. G06Q 10/109
2004/0030753 A1* 2/2004 Horvitz ................ G05B 19/404 709/206
2005/0251558 A1* 11/2005 Zaki ........................ H04L 51/14 709/206
2008/0004926 A1* 1/2008 Horvitz ................ G06Q 10/047 705/7.26
2009/0157672 A1* 6/2009 Vemuri .................. G09B 19/00
2010/0214428 A1* 8/2010 Wood ................... H04N 1/0035 348/222.1
2010/0271202 A1* 10/2010 Lin ......................... B60R 25/00 340/540
2012/0293341 A1* 11/2012 Lin ......................... B60R 25/00 340/901
2014/0067649 A1* 3/2014 Kannan ................... H04L 67/20 705/38
2014/0100904 A1* 4/2014 Wolf .................. G06Q 10/1095 705/7.19
2014/0247383 A1* 9/2014 Dave .................. H04N 5/23293 348/333.02
2015/0006632 A1* 1/2015 Tomkins ................. H04L 51/20 709/204

* cited by examiner

FIG. 4C

THIRD PART ACTION TRIGGERS

CLAIM OF PRIORITY

This application is a continuation of U.S. application Ser. No. 16/020,616, filed Jun. 27, 2018, which is a continuation of U.S. application Ser. No. 15/264,023, now patent Ser. No. 10/037,133, filed Sep. 13, 2016, which is a continuation of U.S. application Ser. No. 15/197,301, now U.S. Pat. No. 9,474,043, filed Jun. 29, 2016, which application is a continuation of U.S. application Ser. No. 14/752,369, now U.S. Pat. No. 9,408,182, filed Jun. 26, 2015, which claims the benefit of U.S. Provisional Application Ser. No. 62/167,726, filed on May 28, 2015. The entire contents of each of the foregoing applications are incorporated herein by reference.

BACKGROUND

The advent of cloud based services, search engines, mobile applications, and location-aware devices have drastically expanded the utility of mobile user devices over the last decade. Many such user devices now provide context-aware services and applications in addition to voice and data access. Furthermore, with the recent advances in processing systems, many previously disparate applications and services are now able to work together to provide enhanced capabilities and user experiences.

Many of these application services available to users are instantiated by use of command inputs. One such service is creating action triggers. For example, a user may speak (or type) the input [remind me to buy milk this evening] into a smartphone, and the smartphone, using a command parsing application (or, alternatively, communicating with a command parsing service) will invoke an action trigger process that may solicit additional information from the user. Such information may be a time, if the user desires for the action trigger to be performed at a certain time, and/or a location, if the user desires for the action trigger to be performed when the user arrives at the location. While the setting of such action triggers are very useful in a relatively fluid user experience, the users often forget to do the things they wanted to do because they cannot setup action triggers that are based on the context that they need to be in to be able to complete the task at hand.

SUMMARY

This specification relates to action triggers, which are associations of user defined events and actions, that are generated by use of an action trigger prompt rendered with a resource. In an example implementation, application pages and web-based resources include an action trigger prompt though which a user may set up a notification that is specific to the user. The notification is subject to parameter value criteria set by the user. The publishers of the applications and web-based resources, which are generally referred to herein as "third parties," may then provide a notification to the user once the criteria for the notification are met. Alternatively, the third parties may provide data to a system that, independent of the third party, manages the action triggers for multiple different third parties. The third parties may provide the data to the system automatically, or the data may be requested, searched, or otherwise gathered by the system.

In additional implementations, the action trigger prompts and the action triggers created by use of the action trigger prompts may be implemented entirely independent of third parties. For example, the systems described in this specification may be configured to identify the parameters rendered on a resource, and for at least one of the parameter values displayed on the resource, render an action trigger prompt with the rendered resource. This frees the third parties of back-end system development and resource layout design and coding efforts. However, the developers of the third-party content will still benefit for increased user engagement, as described in more detail below.

The action that can be taken in response to an event occurring can be user defined. In some implementations, the action, when taken, may or may not enable the user to take subsequent actions. In the case of the former, for example, the action may be a notification that an event has occurred, or, alternatively, the action may be performed by the user device, or by some other device or party, without notification to the user. In the case of the latter, for example, the action may be a confirmation prompt to take a subsequent action. For example, the user may have set an action trigger with an event of Company X stock falling below $620 a share, and may have set the action to be a presentation of a confirmation prompt to purchase 10 shares of Company X stock when the event occurs. The user may then accept or reject the confirmation when presented with the confirmation prompt when the action occurs. Should the user accept the confirmation, a subsequent action that results in the purchase of the stock can be performed (or, alternatively, the user may be presented with a resource through which the user may purchase the stock).

In some implementations, the notification is provided to a software assistant for the user. For example, the third party may have a proprietary data source which when a user defined event is met the third party system notifies the personal assistant application. Alternatively, the personal assistant application may monitor the data source, or content published by a resource, and detects the occurrence of the event. The software assistant then determines the importance of this notification and surfaces it to the user in the best determined way, e.g., according to one or more conditions that are either automatically determined by the assistant or set by the user.

The notification may be informative only, or may alternatively be interactive. In the latter case, if the user interacts with the notification, the user may be linked back to the initial application or web page from which the user set the notification, or some other resource that permits the user to execute an action related to the notification. This allows for a very efficient engagement model with the user and that brings the user to the third party service at a desired time.

Implementations of the subject matter described below allows for an intuitive, more accurate, and more tailorable user experience when creating action triggers. The creation of an action trigger that is contextually relevant to content that the user is viewing allows the user to set a reminder or action and be alerted of events relevant to that content. This provides a very fluid and intuitive interaction model for the user that makes it easier for the user to set up an alert or action.

For example, a user may be viewing a resource through which tickets for concerts may be purchased. The user may search for a particular artist and may learn that the artist is not currently on tour. By use of the action trigger, however, the user may set up a reminder to be notified when new tour dates are published for the artist, or to even automatically purchase tickets for a particular tour venue when the tickets become available This reduces the necessity for a user to keep a particular schedule or check the resource frequently, and can facilitate notifying the user of user defined events or performing user defined actions when the user defined event has occurred. The notifications may be made in real-time to better equip the user to respond in a timely and efficient manner. Additionally, in some implementations, the user can select for the user defined action to be completed once the user defined event has been determined to occur.

A variety of notification types may be used, including a mobile operating system (OS) push notification, text message, email, a web or digital assistant alert, or other form of notification. As described above, in the case of a digital assistant alert, the digital assistant may determine the proper time, place, and method to notify the user or take action on the user's behalf. For example, if the user is in a business meeting, the digital assistant may wait to notify the user until the user is out of the meeting, or after the user's work day is completed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4C is an illustration of a user interface providing a notification that the value of the first parameter is the parameter value of value input.

Like reference numbers and designations in the various drawings indicate like elements.

DETAILED DESCRIPTION

An action trigger processing system facilitates action triggers including user defined events. In operation, a resource, e.g., a web page resource or a particular application page in an application, includes instructions that cause the user device to display an action trigger prompt that is rendered in an initial state. The resource is provided to the user device, and the resource and action trigger prompt are rendered at the user device. An action trigger menu that includes an input for a user defined event may be provided if the action trigger prompt is selected at the user device. The action trigger menu may also define one or more actions that can be taken when the event occurs. The association of the action and the events is referred to as an "action trigger," and the action trigger may be stored in an action trigger data store.

The action trigger processing system obtains updates and information associated with resources from event data (e.g., by searching or receiving data of the resources), and when the action trigger processing system determines that the user defined event of the action trigger has occurred, the action trigger processor may perform the action when the event occurs. The action may be an action that is performed automatically with or without a notification to the user, or may be the providing of a notification to the user, or may be the providing of a confirmation prompt to take a subsequent action. In some implementations, the user defined action for the action trigger may be initiated when the action trigger processing system determines the user defined event has occurred. In some implementations, an automatic operation may be completed after the user defined event has occurred (e.g., automatic ticket purchase when concert tickets go on sale). Further, in some implementations the action trigger processing system may receive a selection by the user of one or more trigger conditions that indicate a condition to be satisfied in determining that the user defined event has occurred.

In some implementations, code for the action trigger prompt may be included in the web page resource or application page. In other implementations, the code may be inserted into the web page resource or application page. In still other implementations the action trigger prompt may be rendered as an overlay to the web page resource or application page.

The action trigger processing system can be implemented in the user device, or in a computer system separate from user device, such as a server system. In the case of the latter, the server system receives input from the user device and sends data to the user device for processing. These features and additional features are described in more detail below.

Figure 1:
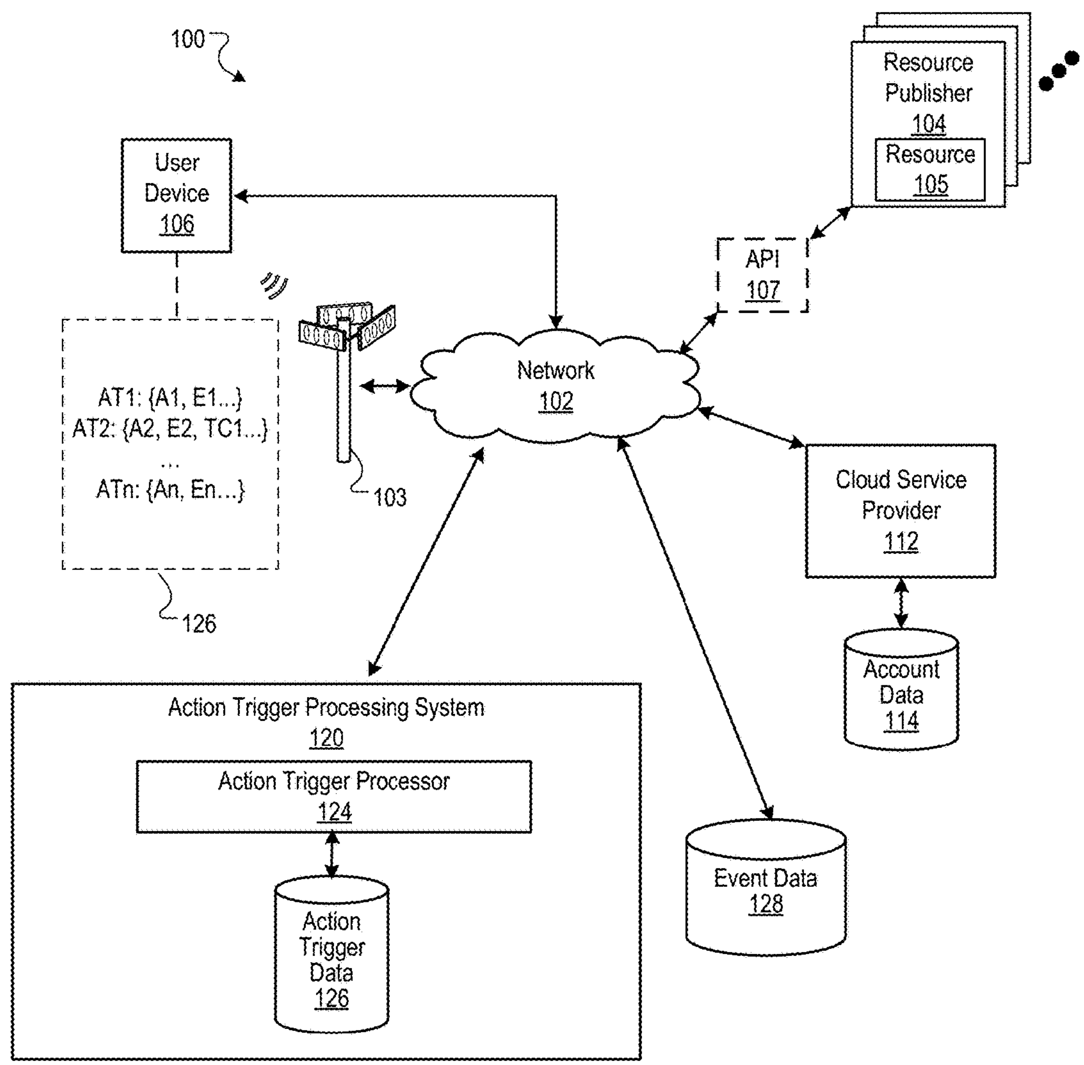
FIG. 1 is a block diagram of an example environment in which command inputs are processed for action triggers.

FIG. 1 is a block diagram of an environment 100 in which command inputs are processed for action triggers including user defined events. A computer network 102, such as the Internet, or a combination thereof, provides for data communication between electronic devices and systems. The computer network 102 may also include, or be in data communication with, one or more wireless networks 103 by means of one or more gateways.

A resource publisher 104 includes one or more resources 105. There may be one or more resource publisher 104. The resource publisher 104 may be a website publisher, an application publisher, among others. In implementations where the resource publisher 104 is a website publisher, the one or more resources 105 are associated with a domain and hosted by one or more servers in one or more locations. Generally, a resource publisher website is a collection of web pages formatted in hypertext markup language (HTML) that can contain text, images, multimedia content, and programming elements. Each website is maintained by a content publisher, which is an entity that controls, manages and/or owns the website. A web page resource is any data that can be provided by a publisher resource 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network.

A resource, as used in this specification, may also be a particular application page of a stand-alone application that is run separate from a web browser. For example, a ticket selling agency may publish an application that sells tickets to various events. The application may have various pages, such as a page for musical artists, another page for sporting events, and another page for plays, for example.

User device 106 is an electronic device that is under the control of a user and is capable of requesting and receiving resources over the network 102, also capable of performing other actions. Example user devices 106 include personal computers, mobile communication devices, wearable devices, and other devices that can send and receive data over the network 102. In the example of FIG. 1, the user device 106 is a smartphone. An example smartphone is described with reference to FIG. 5 below. The user device 106 may communicate over the networks 102 and 103 by means of wired and wireless connections with the networks 102 and 103, respectively. The user device 106 may also be a device that accesses the network 102 by means of an intermediate device and a short range wireless transceiver, such as a WiFi, Bluetooth, etc. As described with reference to FIG. 5, a user device may be able to perform a set of device actions for various programs and capabilities.

The user device 106 is associated with a user account, such as an account hosted by a cloud service provider 112 that provides multiple services. These services may include search (web, intranet, documents, and applications, among others), web mail, calendar, social networking, messaging, documents storage and editing, an electronic assistant service, etc. The account data 114 may store data specific to the account of the user device 106. Further, although only one user device 106 is shown in FIG. 1, a plurality of user devices 106 may be included.

In some implementations, the user may invoke actions and events that cause the actions to be performed by means of an action trigger prompt provided with resources. The generation of action triggers, which are an association of user defined events and user defined actions, and the processing of such items are described in more detail below. An action trigger processing system 120 receives the action triggers, either from the third party publishers or user devices, and stores the action triggers in an action trigger data store 126. While the action trigger processing system 120 is shown as a separate entity in FIG. 1, the action trigger processing system 120 can be implemented in the cloud service provider 112, or alternatively as a separate system by each third party. In certain embodiments, action trigger processing system 120, or subparts thereof, may form a portion of or be stored on user device 106.

Action triggers that are stored in the action trigger data store are the association of actions and events. The action trigger processor 124 accesses event data 128 to determine which events are met, and whether to perform the actions associated with the events that are determined to be met. As used herein, event data 128 is any data that can be used to determine whether an event has occurred. The event data may be data that is preprocessed and sent to the action trigger processor, or may be other data that can be searched by or on behalf of the action trigger processor 124. For example, the event data 128 may be data that is provided to the action trigger processing system 120 by the third parties, or may be data that is requested by the action trigger processing system periodically, or may even be an indexed corpus of resources, knowledge graph, or any other data source that may be searched for parameter values to determine whether an event has occurred.

The action trigger processor 124 will store the action trigger in an action trigger data store 126. There may be a plurality of action triggers AT1, AT2, . . . ATn stored in action trigger data 126. A group of action triggers (e.g., those created or previously implemented by the user) may be viewed at the user device 106, and the user may make changes (e.g., add, delete, modify) at the user device 106 to the action triggers at any time. Each of the plurality of action triggers may have one or more user defined events E1, E2, . . . En associated with an action A. Upon the occurrence of a user defined event, the action trigger processor 124 may cause the action to be performed. The action may be one or more of: the presentation of a notification that the event occurred; an action that is performed partly or fully automatically and separate from the user device; or the presentation of a prompt to perform another action. For example, based on the example above, the user selects or specifies a user defined action, such as "buy tickets," to take place when the user defined event occurs.

Additionally, in some implementations, a user may provide trigger conditions Tc1, Tc2, . . . Tcn associated with the one or more action triggers. Generally, the trigger conditions are additional conditions or events that are not available in the action trigger prompt menu but that a user can associate with an action. A trigger condition specifies a condition to be satisfied in determining that the user defined event indicated in the action trigger has occurred, or that may be required to be satisfied before the user is notified of the events being met. For example, suppose a user has set an action trigger to be notified when tickets become available for an artist.

The user may also specify that notifications should be provided only during appropriate times during which the user is able to review and respond to the notifications. For example, the user may also set a condition that the user is not to be notified of tickets coming available based on the user's availability according to the user's calendar. Thus, the presentation of the notification may be delayed when the user's calendar indicates the user is currently engaged in an appointment, e.g., if the user is in a meeting as scheduled on the user's work calendar.

Trigger conditions may be one or more time period condition, location area condition, or person proximity condition, among others. A time period condition may be a date, a date range, a time of day, or a time of day range, among others. For example, time period condition may be a default or user set time range (e.g., 1 PM-5 PM) on a particular Saturday (e.g., the next Saturday), every Saturday, selected Saturdays, or a pattern of Saturdays (e.g., the first Saturday of every month).

A location area condition may be an area around a particular location (e.g., house address) or type of location (e.g., grocery store, airport, hospital) that the user device 106 is to be within or near for the user defined event to be met. For example, the location area condition may be "At Home," which may be defined by the user on the user device 106. Additionally, "near" can be a particular distance from (e.g., feet or miles) or amount of time away by different modes of transportation (e.g., by car, public transportation, walking) from the identified location. Particular location types may be specified by the user, or may be inferred. For example, in the case of the latter, the location at which a user is most often located during the evening and through mid-morning on weekdays may be inferred as "Home," and the location that the user is most often located during late morning and afternoons on weekdays, if different from the inferred "Home" location, may be inferred as "Work."

Additionally, a trigger condition may be a person proximity condition. A person proximity condition may be met if the user device 106 of the user is within a threshold distance from an identified user device of a particular person or group.

In some implementations, when creating an action trigger, a user defined event may be created based on the content of the resources 105, and a parameter may be selected or input at the user device 106. An example of this is illustrated with reference to FIGS. 2A-2D. The flow through FIGS. 2A-2D is described with reference to FIG. 2E, which is a flow diagram of an example process 250 for creating an action trigger and performing an action based on the action trigger. The process 250 may be implemented in one or more computers that are used to realize the action trigger processing system 120.

Figure 2A:
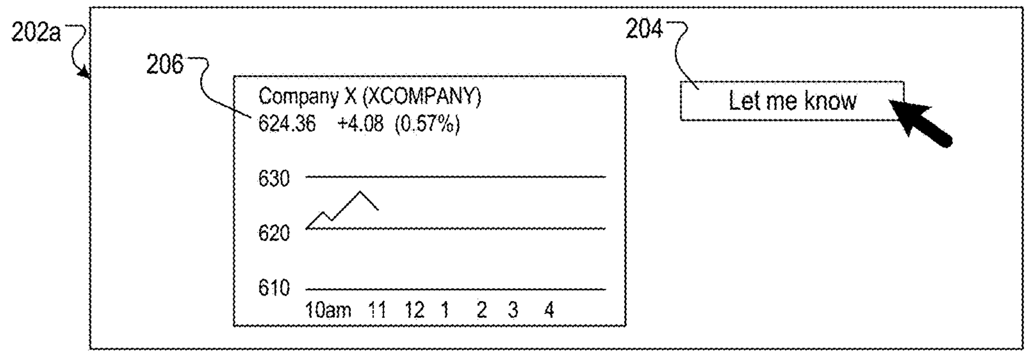
FIG. 2A is an illustration of an interface of a resource in a portion of a web page.

The process 250 receives data responsive to a selection of an action trigger prompt at a user device (252). An action trigger prompt is an element, such as a user interface element in the form of a button, pull-down menu, audible cue, etc. that provides a user with the option to initiate setting an action trigger. The action trigger prompt is rendered or provided at the user device with a resource and displayed with the resource, and is rendered or provided in an initial state. Upon selection or activation of the action trigger prompt the user device displays an action trigger menu that facilitates the input of multiple parameter values for an event. This selection and menu for the action trigger prompt is shown with reference to FIGS. 2A-2C. In particular, FIG. 2A is an illustration of an interface 202*a* of a resource in a portion of a web page. The web page may include a list and chart of multiple stocks. The web page 202*a* includes an action trigger prompt 204 in an initial state (e.g., prior to selection) and a first parameter value 206 of a first parameter. In this case, the first parameter is the stock price of the stock "XCOMPANY" and the first parameter value is $624.36.

Figure 2B:
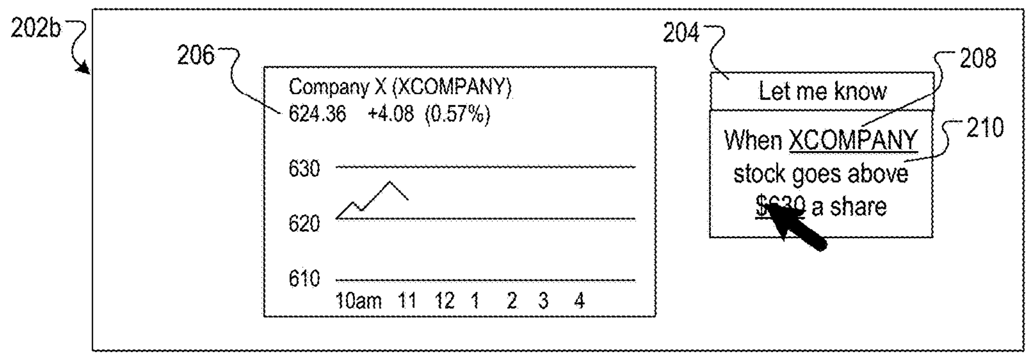
FIG. 2B is an illustration of an interface of a resource in a portion of a web page after selecting the action trigger prompt.

FIG. 2B is an illustration of an interface 202*b* of a resource in a portion of a web page after selecting the action trigger prompt. Upon selection (e.g., by the pointer) of the action trigger prompt, an action trigger menu is provided that includes an input for a user defined event. The selection generates an action trigger menu that facilitates the input of multiple different possible parameter values for an event.

For example, the user may desire an action trigger for a certain stock price going above or below a certain price, or a certain stock price staying at a value for a period of time, or a certain stock price at a particular time, among others. In the current example, action trigger is related to a certain stock going above a certain price. The user may select a stock ticker 208, which in the current implementation is the particular stock of XCOMPANY, which may be changed by the user. Also, a second parameter value 210 may be selected by the user. In some implementations, a default value may be provided, which could be based on the user history, selections made by other users, or default values, among others. In the current example, a default value of $630 is provided.

In certain embodiments, one or more parameters are automatically selected based on context, such as the content of the web page with which the action trigger prompt 204 is associated or on which it is displayed. For example, when viewing the web page 202*a* showing stock prices for Company X, selection of action trigger prompt 204 displayed with the parameter value 206 automatically provides the ticker symbol XCOMPANY for Company X as a parameter. While this parameter may be changed by the user, the context of the display, user actions, environment, and so on may be used to automatically (and at least initially) set one or more parameters. It is contemplated herein that this functionality can be provided in any or all embodiments in which the action trigger prompt is included in the web page resource or application page, inserted into the web page resource or application page, and/or is rendered as an overlay to the web page resource or application page.

In the case of an overlay, various processes can be used to detect parameters and generate an overlay. For example, a document object model of a resource may be processed to identify predefined parameter types and values, e.g., stock symbols and prices, and an overlay may be rendered by use of iFrame or any other process by which content of a displayed resource may be augmented with additional content. For application pages, a textview object may be extracted from displayed data and processed to identify the predefined parameter types and values, and an overlay can be generated by a separate process that displays additional content in an active region that defines only the action trigger in the viewport. The overlay is generated by use of instructions provided to the user device and that are separate from the instructions that are used to render the resource.

In variations of this implementation, image processing can be used to identify textual content of an image and provide an action menu for certain textual content. In particular, the action trigger processing system 120 may receive data describing textual content recognized for an image taken by a user device and displayed on the user device. The user device may perform the textual recognition and generate data describing the textual content and the location of the textual content in the image and send the data to the action trigger processing system 120. Alternatively, the user device may send the image to another system that processes the image that provides the textual data and location data to the action trigger processing system 120. A variety of text recognition processing techniques can be used.

For example, suppose a user takes a photograph of a tour poster for an artist. The action trigger menu will receive textual data describing content of the tour poster, and may generate an action menu near the text describing the tour. The action menu may include notifications actions to inform the user of various tour dates when the tour is announced, purchase actions to purchase tickets when the tickets go on sale, and so on. The action menu is rendered over the image displayed on the user device.

To generate the instructions for the overlay, the system 120, or, alternatively the user device 106, may process the rendered resource as described above. Upon the detection of certain parameter values, e.g., parameter values for predefined parameters, such as stock symbols, prices, dates, and the like, the system 120, or the user device 106, generates the overlay instructions for processing by the user device.

In some implementations, certain resources may be identified in advance of rendering and a list of the identified resources may be provided to the system 120 or user device 106. Thereafter, when one of the identified resources is rendered at the user device 106, the user device may notify the system 120 and the system 120 may generate the overlay instructions. Alternatively, the user device may generate the overlay instructions.

Figure 2C:
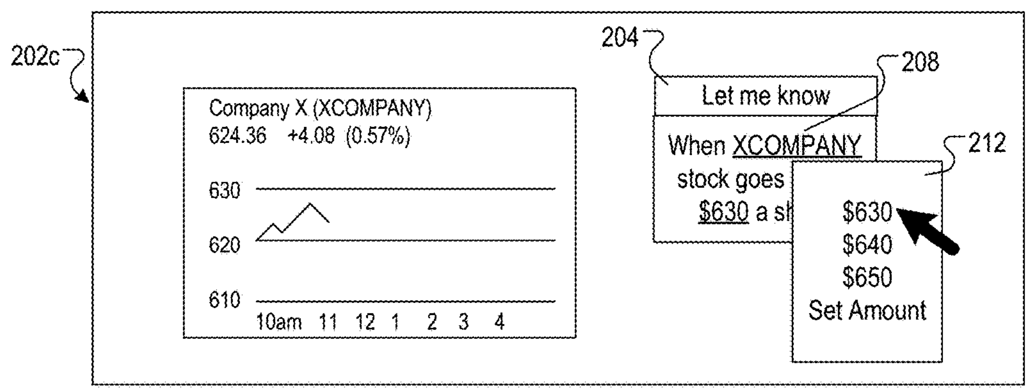
FIG. 2C is an illustration of an interface of a resource in a portion of a web page in selecting the second parameter value in the action trigger menu.

FIG. 2C is an illustration of an interface 202*c* of a resource in a portion of a web page, illustrating selecting the second parameter value 210 in the action trigger menu. In the current implementation, upon selection (e.g., by the pointer) of the second parameter value 210, a second parameter value option list 212 may be provided. The second parameter value option list may include user-selectable options for the second parameter value. The list of options may be based on the user history (e.g., selected a particular stock price or certain percentage above the current stock price in the past), context (e.g., other data being shown in interface 202$c$), other selections provided by other users, or a default set of values, among others. The user may select one of the second parameter value options from the option list 212, or select to "Set Amount," where the user may provide the second parameter value option by inputting a value. In the current example, the user has created a user defined event with a first parameter of "XCOMPANY stock," and a second parameter value of $630.

Upon selecting 630, an action trigger is created. The action trigger in this case is a notification that Company X stock is above $630 a share, and the event that triggers the notification is the value of Company X stock exceeding $630 a share. The action trigger is thus an association of the user defined event and the action to be taken in response to the occurrence of the user defined event. It will be appreciated that additional fields for user-selectable parameters may be provided. For example, a field may be provided permitting a user to specify what action from multiple different actions to take when Computer Co. stock is above $630 per share, such as place a sell order for [x] shares, or send an email to the user's stockbroker, and so on.

In some implementations, actions can be automatically executed by a third party system by use of an API to the action trigger processing system 120 or personal assistant service. The action trigger processing system 120 or personal assistant service may store credentials (e.g., usernames, passwords, account information, etc.). These third party actions may also make use of an electronic wallet. Such third party API level integrations allow the action trigger processing system 120 or personal assistant service to complete financial transactions, e.g., stock trade, ticket purchases, etc., on behalf of the user.

The process 250 stores the data specifying the user defined event and the action associated with the user defined event as an action trigger in the action trigger data store (254). Thereafter, the process 250 will periodically monitor for the occurrence of the user defined event (256), and in response to the occurrence of the user defined event, cause the action associated with the user defined event to be performed (258).

Continuing with the example, the action trigger processor 124 will monitor the stock price of Company X. The monitoring can be done in a variety of ways. For example, the action trigger processor 124 may request to be notified by a third party service when the stock exceeds the value of $630. Alternatively, the action trigger processor 124 may periodically search a web corpus or other data source to determine whether the event has occurred.

Figure 2D:
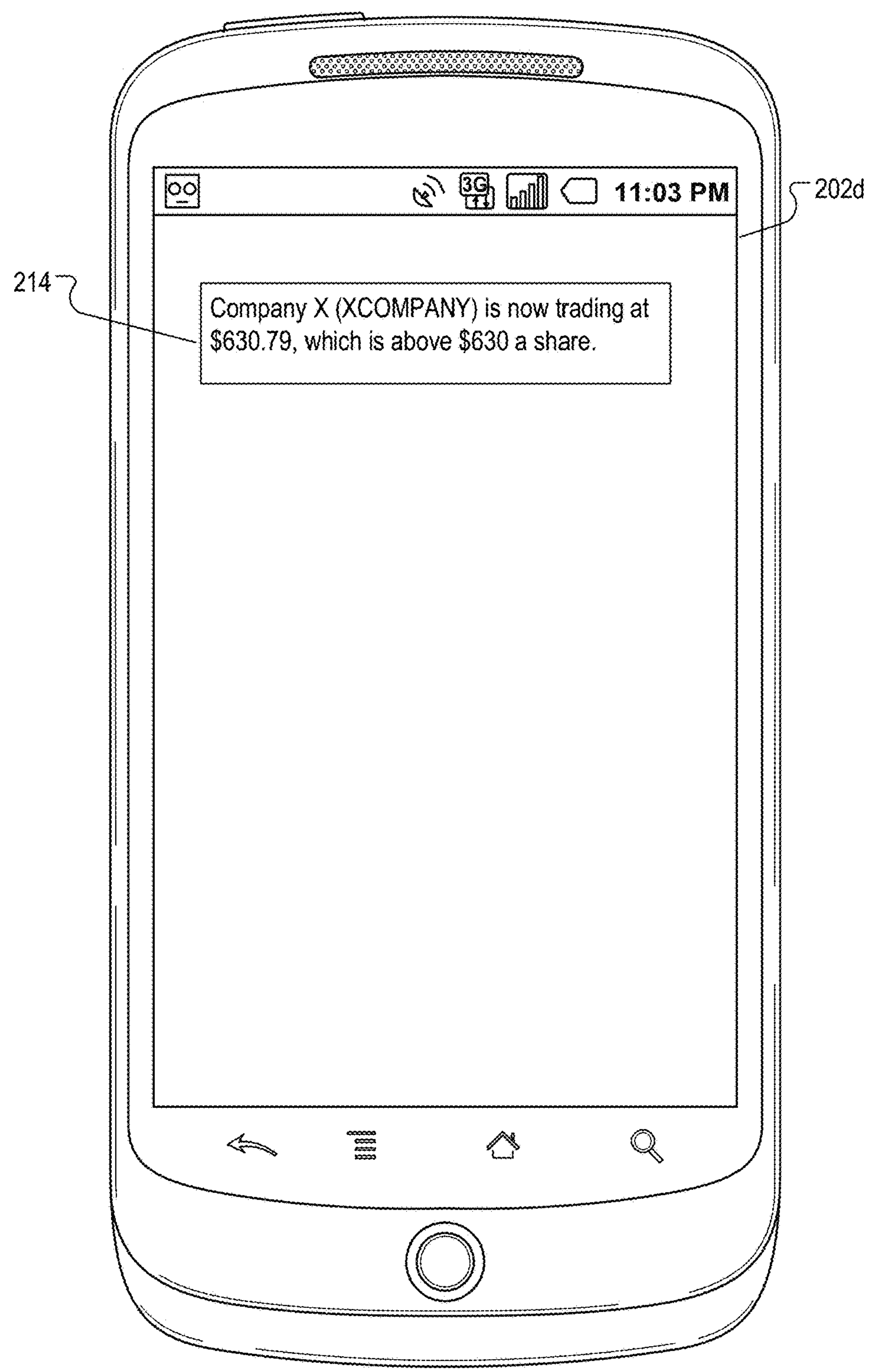
FIG. 2D is an illustration of an interface at a user.
Figure 2E:
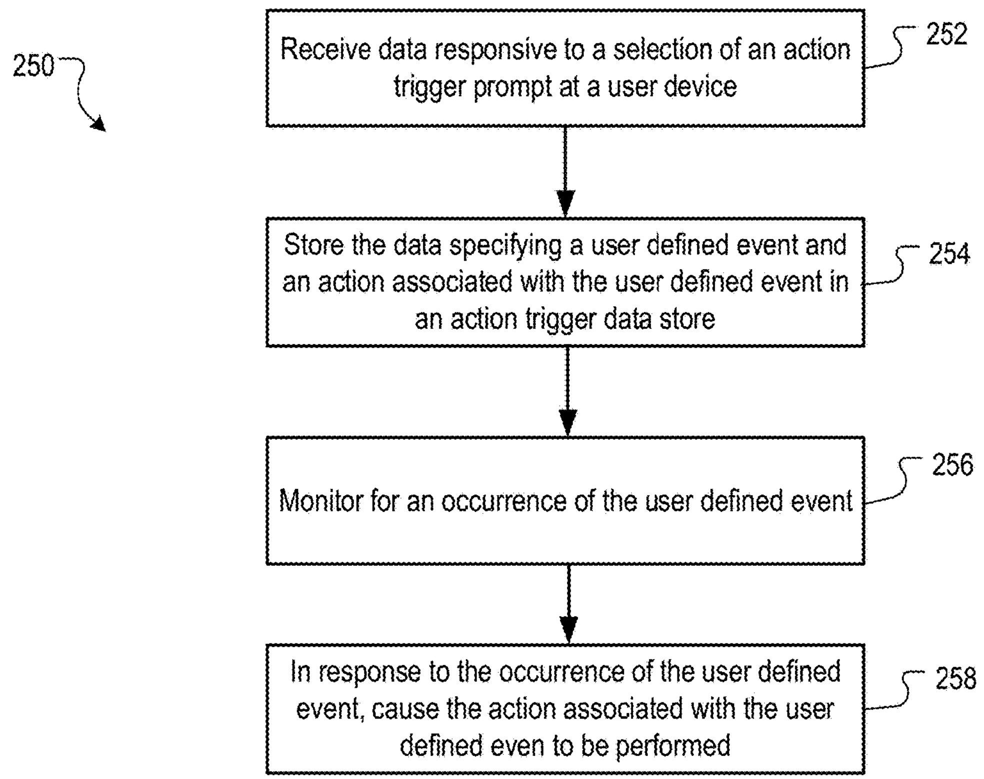
FIG. 2E is a flow diagram of an example process for creating an action trigger and performing an action based on the action trigger.

FIG. 2D is an illustration of an interface 202$d$ at a user device 106 when there has been an occurrence of the user defined event provided in FIG. 2C. In the current implementation, after creating the action trigger and storing the association of the action and the event in the action data store 126, the action trigger processing system 120 may receive updates and/or check data sources associated with the user defined event and action trigger to determine if the user defined event has occurred. In this example, the action trigger processor 126 will determine whether the value of the first parameter, the stock price, meets the second parameter value of $630.

In the current example, the action trigger processing system 120 has made the determination that there has been an occurrence of the user defined event, and a notification 214 is provided to and/or by the user device 106. Additionally, in some implementations, the notification may be provided by the action trigger processor 124, and the user of the user device 106 may access information related to the user defined action. The notifications the user receives may be notifications provided on a mobile device (e.g., Android notifications, In-app notifications, etc.), or notifications on a desktop (e.g., browser notifications, OS notifications, etc.). Within the notification, a link or button to perform an operation (or user defined action) associated with the action trigger may be provided.

Figure 2F:
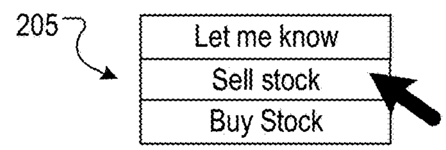
FIG. 2F is an illustration of an action selection menu.

In the current example, the action specified is a notification action. In some implementations, the action trigger prompt 204 may also include an action selection menu that includes a list of selectable actions. The actions may include, for example, actions that can be taken on behalf of the user with or without notification. The actions may be contextual in that the actions available are dependent on the type of content shown in the resource. The system 120 may have data pre-associating particular actions with particular content types. For example, in addition to the "Let me know" selection shown in FIGS. 2A-2C, other actions may be "Purchase stock," "Sell stock," etc., by means of an action selection menu 205 as shown in FIG. 2F. Similarly, if the resource was a ticket purchasing resource, actions may include notifications when tickets go on sale, notifications when an artist announces tour dates, and the purchasing of tickets.

By way of a further example, suppose FIG. 2A depicts not a web page but an image of a stock ticker report taken by the user device. Using the image processing techniques described above, the same action trigger prompt 204 can be generated and overlaid on the image as shown.

In some implementations, selecting the notification may cause the user device to display the resource from which the action trigger was set. Alternatively, if the action was, for example, to purchase stock, selection of the notification may cause the user device to display an environment from which the user may purchase the stock or view confirmation that the stock was purchased.

In some implementations, a notification may be subject to additional presentation criteria. The presentation criteria may be selected, for example, by a software assistant, or alternatively selected by a user. In the case of the former, with respect to notifications, a software assistant may determine from a user's schedule data whether to present a notification to a user, i.e., a notification may only be presented if the user is not in a meeting, etc. In some implementations, the volatility of the underlying data related to the event that caused the notification may be a factor considered by the software assistant. For example, the software assistant may override a user's meeting status and present a notification while a user is in a meeting if, for example, the notification relates to an option to purchase stock and a price specified by the user. Because the volatility of the stock price may change rapidly, the user may benefit from an immediate notification. Conversely, notifications for events for which the underlying data changes less frequently may be delayed and presented to the user at a more convenient time for the user.

By way of another example, when a user selects the action trigger prompt on the user device 106, the action trigger menu may be provided that includes an input for a user defined event. When a resource has multiple different parameters available, the user may be able to select a first parameter. Example parameters may be topics, titles, categories, or other information provided within the content of the resource 105. For example, if the user is viewing a resource related to tickets for Artist A's concerts and the user selects the request prompt provided on the resource, parameters associated with the resource may be concert tickets, locations of concerts, dates of a concert tour, or any other information provided within the content of resource 105. Within the request prompt, the user may input or select a parameter for the user defined event.

The action trigger processor 124 may determine a value for the parameter based on the content provided in the resource. For example, if the user selected concert tickets as the first parameter, then the value for that parameter may indicate the status of the concert tickets, which may be "Not available," or some other indication, from the content of the resource, that the tickets are not available (e.g., sold out or not yet on sale).

After selecting or inputting a parameter, the user may input a parameter value for the indicated parameter to define the user defined event of the action trigger. The user provided parameter value may be different from the parameter value displayed in the resource. For example, the user may create a user defined event to be notified when the concert tickets go on sale, or are otherwise available. Thus, the parameter value specified by the user would be "available."

Additionally, in some implementations, an action trigger may include multiple parameters. For example, based on the example above, the action trigger may include a second parameter related to ticket sections or ticket price ranges for Artist A's concerts. The second parameter may be related to, for example, Artist A's concert ticket prices, and the parameter value provided by the user may be, for example, "less than $40." In the current example, the user defined event would not be met until the user provided parameter values for the first parameter and the second parameter occur, e.g., tickets are available and less than $40.

The action trigger is then created and stored in the action trigger data 126. After the action trigger is created, the action trigger processor monitors for the occurrence of the event(s) associated with the action. Action trigger processor 124 may continuously or periodically (e.g., poll the event data 128 at regular or irregular intervals) search the content, or register for a notification from a third party of data satisfying the event, etc.

As described above, event data may include resources 105. Some content of resources 105 may be information that is generally available and accessible from the resource publisher 104 (e.g., application publisher or website publisher). These resources 105 may be, for example, related to weather, news, entertainment, or any other type of resource that does not require a subscription or authentication to see the information and content of the resource 105.

Further, some content of resource 105 may be information that is not personalized to a particular user, but the content nonetheless may require the user to sign in, or otherwise provide authorization, for access to the content of the resource 105. These resources 105 may be, for example, related to newspapers, journals, or blogs that require a subscription or other type of verification or login from the user in order to access all of the content of the resource.

Moreover, some content of resource 105 may be information that is personalized, and possibly private, to a particular user. These resources may be, for example, related to bank account information or social media websites or applications. These resources 105 may be proprietary to the resource publisher 104 and can also require login or authentication information from the user to access the personalized information and content of the user. The resource publisher 104 may, in some implementations, select or enable individual users to decide if they want their personalized content associated with the resources 105 to be accessible to the action trigger processor 124.

Content of resources 105 that require authorization may not be included in the event data 128 unless the action trigger processing system 120 has access to the authorization information for the user of the user device 106. The authentication information for a particular user of the action trigger processing system 120 may be stored and accessed in different ways, and different amounts of authentication information may be stored for each user depending on, for example, selections indicated by the user (e.g., a user may select for the action trigger processing system 120 to not store or access any authentication and login information for that particular user). For example, a user may provide authentication information, where required, to the action trigger processing system 120 for the resources 105 associated with the resource publishers 104 they would like to be included in the event data 128 (i.e., the data that is accessible to the action trigger processor 124).

Additionally, in some implementations, the user may enable the action trigger processing system 120 to access and keep track of authentication information for resource publishers 104 that the user device 106 of the user has accessed (e.g., a user may enable the action trigger processor 124 to store the authentication information that accesses resources related to bank account information of the user at a publisher resource 104 of a particular bank).

Moreover, a user history related to previous actions performed by the user on the user device 106 may be included in action trigger data 126. For example, previous action triggers, user defined events, and user defined actions may be stored in the action trigger data 126 to enable default, favorite, or common action triggers, user defined events, and/or user defined actions, for the particular user, a group of users, and/or a subset of users, to be selected by the user. Additionally, a context of a user may change or adjust the suggested or favorite action triggers, user defined events, and/or user defined actions. The time of day, week, month, location of the user, frequency and regularity of setting up particular action triggers, among others may factor in to the context of the user. However, in the example above, the user can change the parameters and parameter values that are initially suggested or provided to the user. Additionally, in some implementations, a user calendar on a user device 106 and user interests provided, implicitly (e.g., based on a user history) or explicitly, to the action trigger processing system 120 may factor in to determining suggested action triggers, user defined events, user defined actions, parameters and parameter values. Moreover, the order or ranking of suggested action triggers provided (e.g., as the user is inputting an action trigger) may also adjust and change based on context, prior action triggers, or other information.

Figure 3:
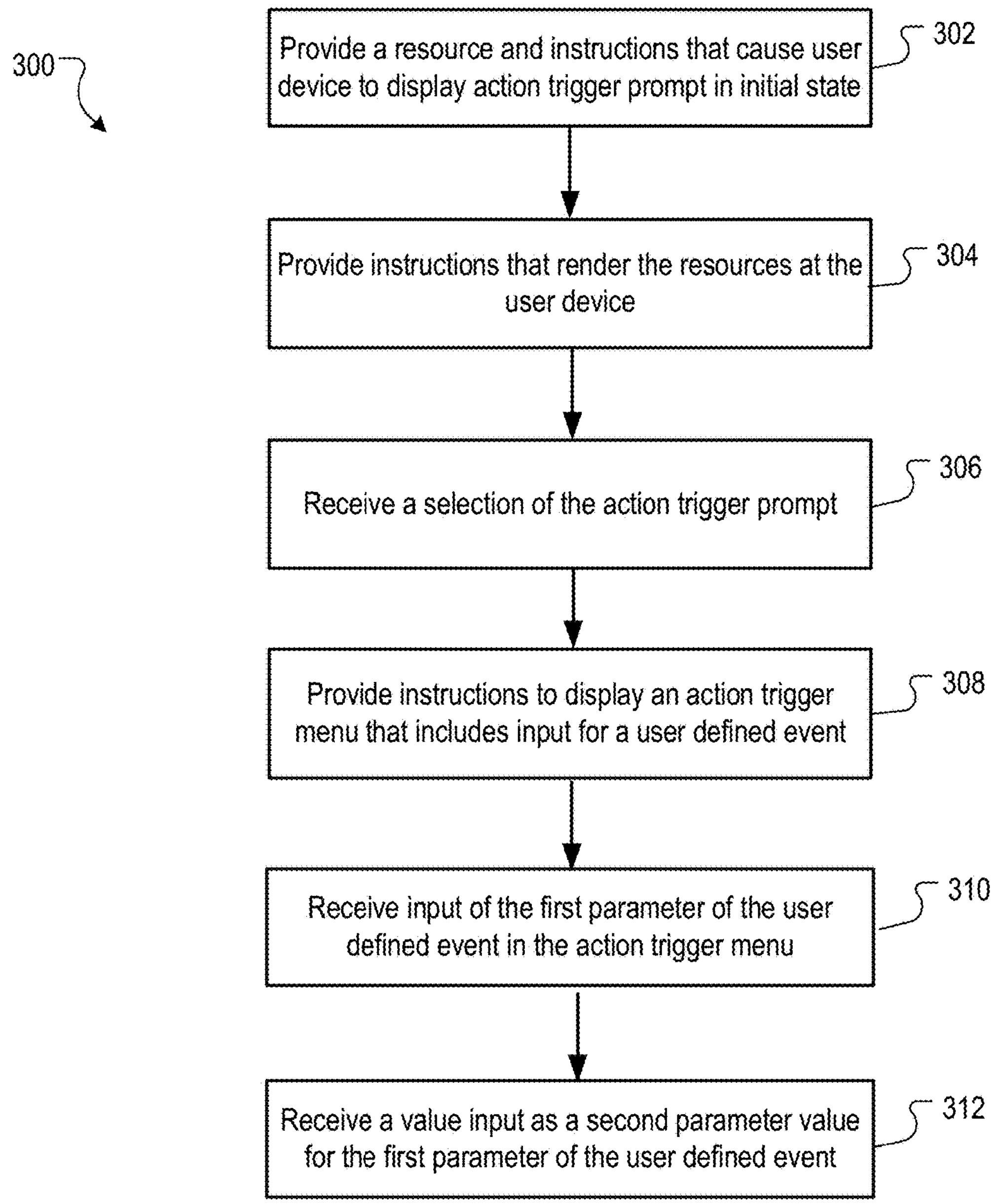
FIG. 3 is a flow diagram of another example process for creating an action trigger.

FIG. 3 is a flow diagram of an example process 300 for creating an action trigger from a resource 105 of a resource publisher 104. The process 300 can, for example, be implemented by the action trigger processor 124. In some implementations, the operations of the example process 300 can be implemented as instructions stored on a non-transitory computer readable medium, where the instructions cause a data processing apparatus to perform operations of the example process 300.

A resource 105 that includes a first parameter value of a first parameter and instructions that cause the user device 106 to display an action trigger prompt that is rendered in an initial state is provided (302). Each resource 105 may include content and the action trigger processor 124 may determine one or more parameters from the content provided in the resource 105. For example, the first parameter may be topics, titles, categories, or other information provided within the content of the resource 105. The first parameter value may indicate information provided in the content of the resource 105 related to the first parameter. For example, the first parameter value may indicate availability, cost, or a weather condition, among others.

The action trigger prompt may be displayed along with or within the resource 105. The action request prompt may be included from the resource publisher 104 when the resource 105 is provided to the user device 106, or in other implementations, the action trigger processing system 120 may provide the action request prompt to the user device 106, where the action request prompt is provided with the resource 105 or overlaid over the resource 105. If the action request prompt is included from the resource publisher 104, the action trigger processing system 120 may provide the required scripting to the resource publishers 104 that include the action triggers (e.g., via API 107).

Instructions are provided that render the resource 105 at the user device 106 (304). The resource 105 may then be rendered at the user device along with the action trigger prompt. A selection of the action trigger prompt at the user device 106 is received (306).

Instructions that cause the user device 106 to display an action trigger menu that includes an input for a user defined event are provided (308). After selection of the action trigger prompt, the action trigger menu may be provided where the user, via the user device 106, can select or input a user defined event to be notified of when the event occurs, or in some implementations, a user defined action may be initiated or completed when the particular user defined event occurs.

Input of the first parameter of the user defined event in the action trigger menu is received, where the resource 105 includes a first parameter value for the first parameter (310). The user defined event may include a first parameter that is input or selected by the user at the user device 106, as previously described. The first parameter includes a first parameter value, based on the content provided in the resource 105. For example, the first parameter value may indicate a status, availability, cost, or a weather condition, among others. In an example of a particular stock quote shown at a resource 105 (e.g., a web page or mobile application) including information of a particular stock, a first parameter may be, for example, the stock price, earnings, opening and closing price, or other type of information that may be obtained from the resource 105.

For example, if the first parameter is the stock price, and the first parameter value may be the current price or what is listed as the current price at the resource 105, for example $600 per share. Likewise, in a resource 105 that includes concert tickets for a particular artist, the first parameter may be ticket availability (e.g., a new tour for the artist), ticket price, seat location, concert location, or other type of information that may be obtained from the resource 105. In the current example, the first parameter is ticket availability, and the first parameter may indicate that concert tickets for the particular artist are unavailable.

A value input as a second parameter value for the first parameter of the user defined event is received, wherein the second parameter value only specifies a parameter value that is different from the first parameter value (312). The user defined event may also include a second parameter value that is input or selected by the user at the user device 106. The second parameter value may indicate the event related to the identified first parameter that the user would like to be notified of, or a user defined action to take place when the second parameter value is reached by the first parameter, based on the content of the resource 105.

The action trigger processor 124 may search the event data 128 to determine a parameter value of the identified parameter. Based on the stock price example above, the second parameter value of the stock price may be provided by the user, and may be, for example, $630 per share. When the action trigger processor 124 determines from the data provided in the resource 105 and/or the event data 128 that the value of the first parameter has met the value of the second parameter value, then a notification of such may be provided to the user device 106 (e.g., stock of Company X has reached $630) or a user defined action may be set to take place (e.g., the action trigger system 120 may be directed to sell the stock). Likewise, with respect to the concert ticket example above, a second parameter value of ticket availability may be, for example, a new tour (i.e., tickets for sale). When the action trigger processor 124 determines from the data provided in the resource 105 and/or the event data 128 that the value of the first parameter (ticket availability) has met the value of the second parameter value (tickets for sale), a notification of such may be provided to the user device 106 (e.g., tickets for Artist A are now on sale) or a user defined action may be set to take place (e.g., the action trigger system 120 may be directed to purchase tickets).

Figure 4A:
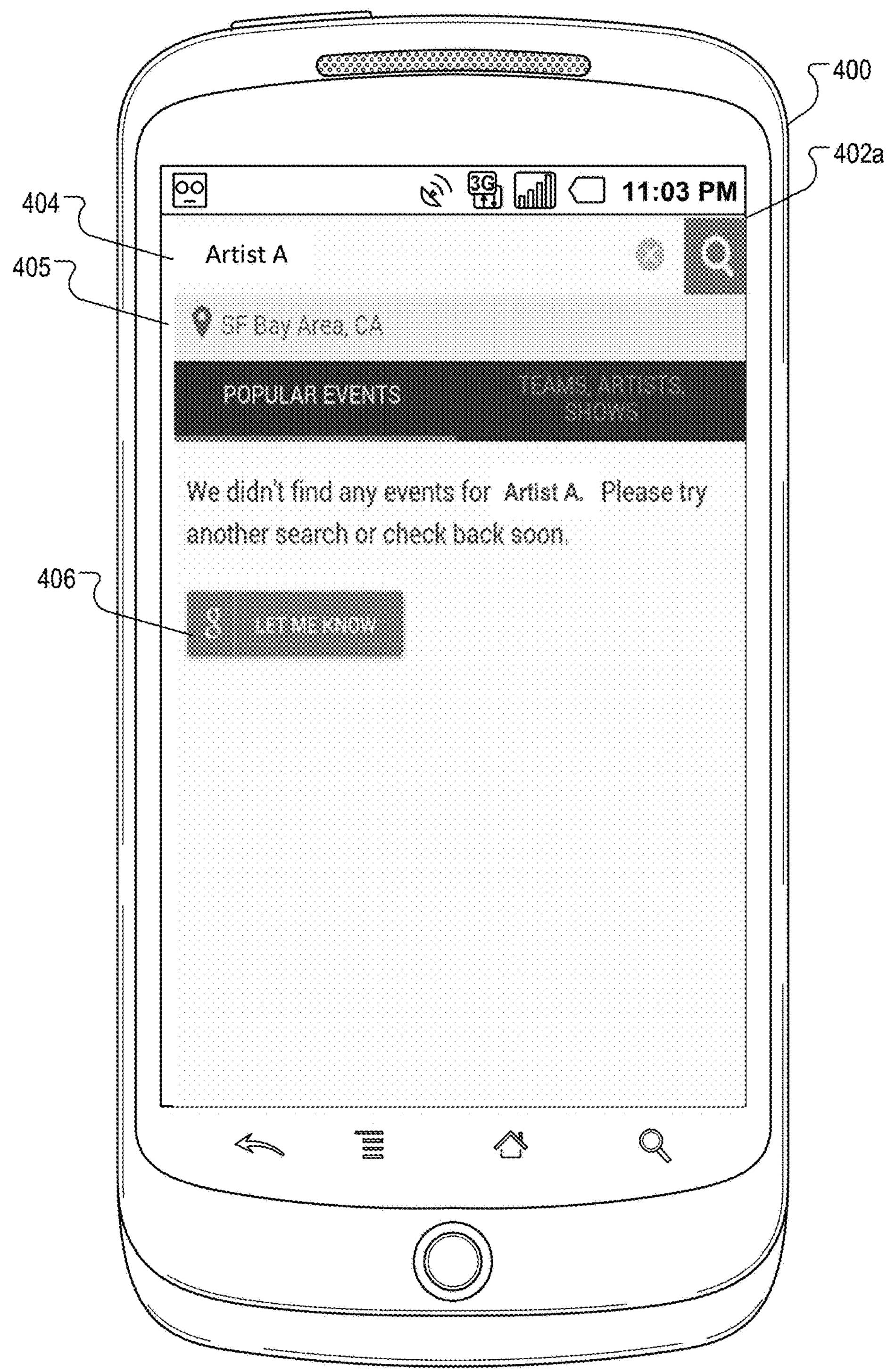
FIG. 4A is an illustration of a user interface at a user device in which an action trigger prompt is provided along with a resource.

For example, FIG. 4A is an illustration of a user interface 402*a* at a user device 400 in which an action trigger prompt is provided along with a resource 105. Within resource 105, which in the current example may be an event ticket selection and purchase web site or application, a search input 404 may be provided. In the current example, "Artist A" has been provided in the search input 404, and the resource 105 has indicated there are not currently any events for "Artist A." Also, a location identifier 405 is provided in the resource 105, which may be a current location of a user device 106 of the user or a location the user has provided or input. Additionally, an action trigger prompt 406 is provided in the resource 105 to enable the user of the user device 106 to create an action trigger.

Figure 4B:
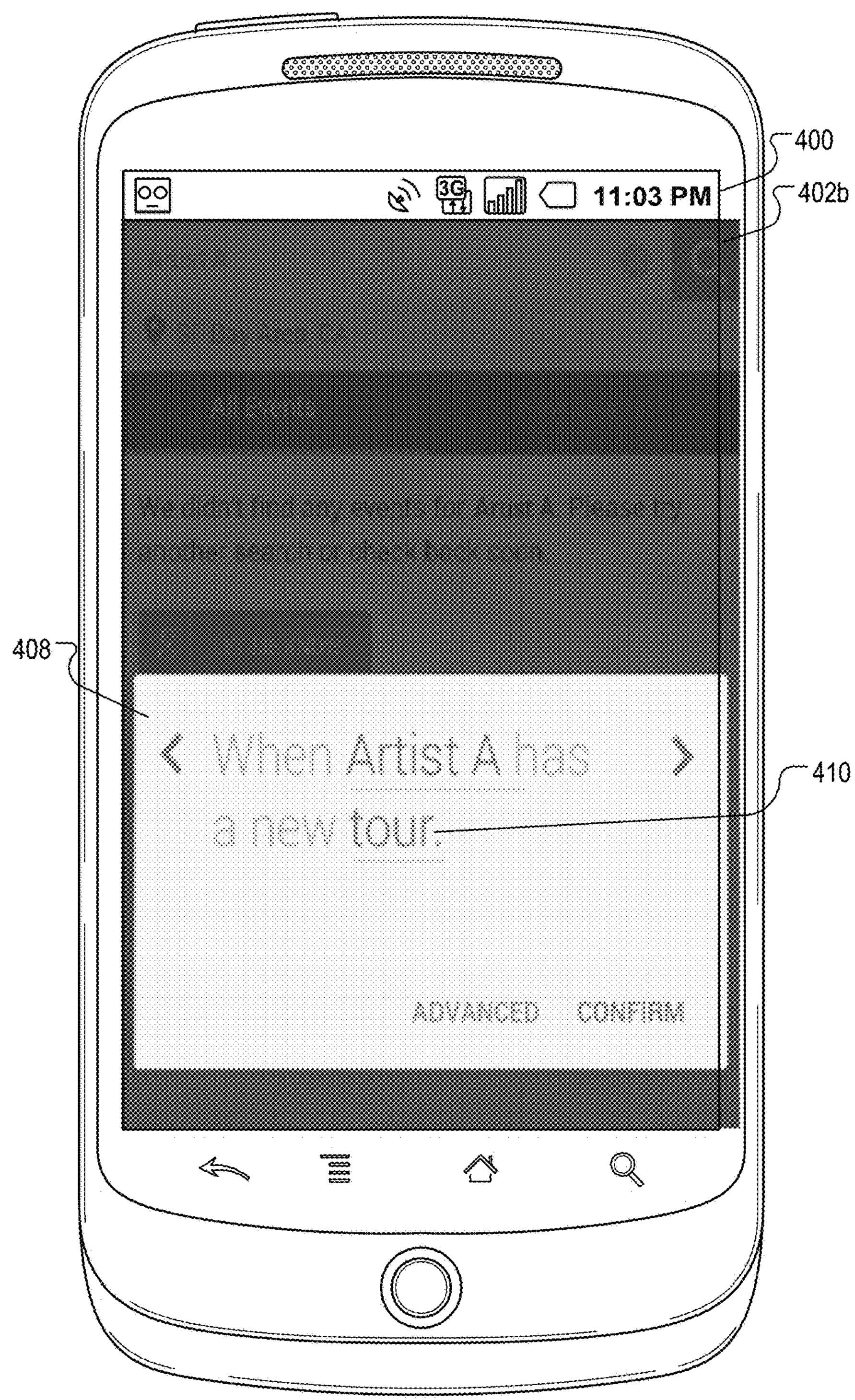
FIG. 4B is an illustration of a user interface where an action trigger menu is provided.

In FIG. 4B, an illustration of a user interface 402*b* provided where the action trigger prompt 406 has been selected, and an action trigger menu 408 is provided. In the current example, based on the content provided in resource 105, the action trigger processor 124 may provide a suggested user defined event and the user may be able to input or provide a different selection for the user defined event (e.g., by use of the arrows in action trigger menu 408). The suggested user defined event may be based on the information of action trigger data 126 and/or event data 128. In the current example, a suggested user defined event of "When Artist A has a new tour" is provided. The first parameter may be determined to be related to Artist A's tours, and based on the location content provided in resource 105, the first parameter may be related to Artist A's tours in the "SF Bay Area, Calif."

The first parameter value, in the current example, may indicate that the concert and tour information for the first parameter is not available. In some implementations, the first parameter value may be input or provided by the user of the user device. At value input 410, the user may provide a parameter value of the first parameter to complete a definition of the user defined event, and when the first parameter at resource 105 has a value of the user provided parameter value, then the user defined event may be met. In the current example, the user provided parameter value is related to Artist A's "tour," and specifically a new tour. In some implementations, based on the content of resource 105 and the information of action trigger data 126 and/or event data 128, which may include, for example, interests and a user history, of the user of user device 106, a suggested or hierarchy of user provided values to include in value input 410 may be provided.

Figure 4C:
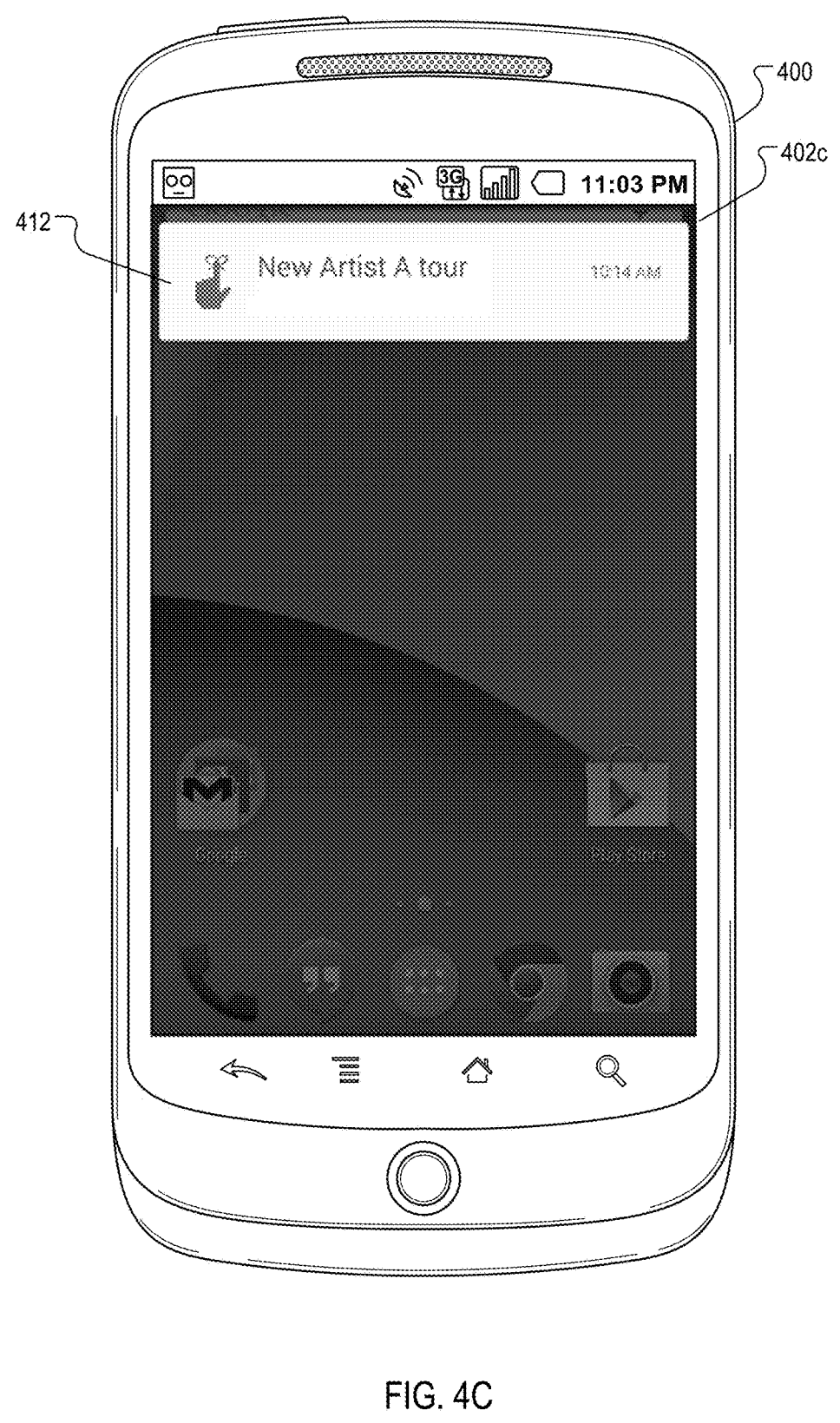

In FIG. 4C, an illustration of a user interface 402*c* is provided showing a notification that the value of the first parameter has met the parameter value of value input 410, or a second parameter value. As previously described, action trigger processor 124 obtains updates and status information associated with resource 105 from event data 128, and when the action trigger processing system 120 determines the user defined event has occurred, the action trigger processor may provide a notification that the value of the first parameter is the second parameter value to the user device, or in some implementations, a user defined action may be complete when the action trigger processing system 120 determines the user defined event has occurred. In the current example, FIG. 4C indicates that the user defined event has occurred, and a user defined event notification 412 is provided to the user device 106 of the user. In some implementations, a user may select the user defined event notification 412 and the user may be provided with information associated with the user defined event, and in the current example, the user may be directed to the resource 105 to see information related to Artist A's tour and see ticket purchase selections.

In some implementations, the user of the user device 106 may select or provide a user defined action to occur once the action trigger processing system 120 determines there has been an occurrence of the user defined event. For example, based on the example provided in FIGS. 4A-4C, the user may provide a user defined action to the action trigger processing system 120, via the user device 106, to purchase tickets when resource 105 indicates that Artist A has a new tour (and tickets are available). Additionally, the user defined action may specify, for example, a number of tickets, a date or date range, a price range, and a section in which to purchase the tickets. Additionally, a notification may also be provided to indicate that the user defined action has been performed (and a notification may also be included to indicate the user defined event has occurred before or while in the process of performing the user defined action).

Moreover, in some implementations, the presentation of a notification may be provided to a device other than user device 106. For example, the presentation may be provided to a device that is determined to be close to the user or a device that the user will see or is looking at. For example, if the user device 106 of the user is not currently visible to the user, but the user is viewing another device, the action trigger processing system 120 may determine to present the notification to the device the user is viewing.

Action trigger prompts can also be provided for many other types of content that have varying parameter values. For example, an action trigger prompt may be provided for an advertisement. Selection of the prompt may enable the user to select various actions and events related to the product or service being advertised. By way of example, for an advertisement advertising a product that is yet to be released, the user may set a notification of the release that triggers on the release of the product. Conversely, for a product that is currently for sale, the user may set an action to purchase the product when the product goes on sale, e.g., 10% off, by a particular retailer. In this latter example, the user may specify a particular sale price as the trigger, or the user may specify any sale event as a trigger.

In situations in which the systems discussed herein collect personal information about users, or may make use of personal information, the users may be provided with an opportunity to control whether programs or features collect user information (e.g., information about a user's social network, social actions or activities, profession, a user's preferences, a user's current location, location trajectory, inferred locations such as home/work, inferred context, calendar data, upcoming events/bookings from email, etc.), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 5:
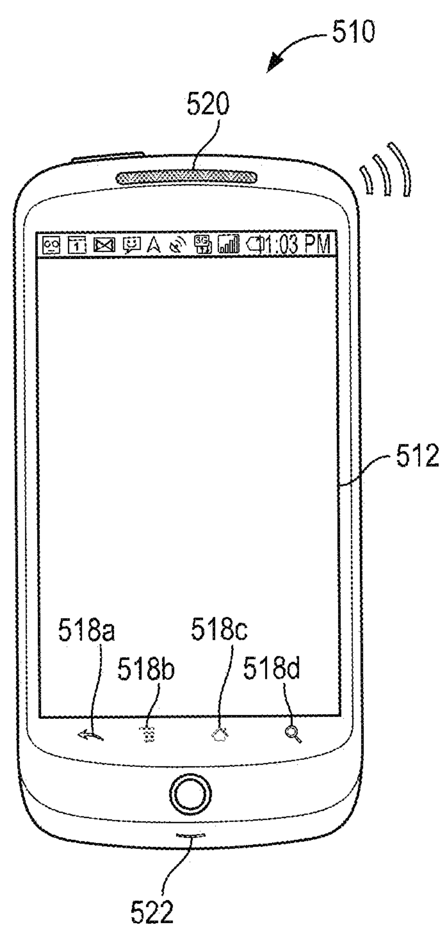
FIG. 5 is a block diagram of an example mobile computing device.

FIG. 5 is a block diagram of example mobile computing device. In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components.

The mobile computing device 510 may include mechanical or touch sensitive buttons 518*a-d*. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

The mobile computing device 510 may include other applications, computing subsystems, and hardware. A voice recognition service 572 may receive voice communication data received by the mobile computing device's microphone 522, and translate the voice communication into corresponding textual data or perform voice recognition.

The mobile computing device 510 may communicate wirelessly with one or more networks to provide a variety of services, such as voice and data services.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:

receiving, by a data processing apparatus and from a user device, data responsive to an action trigger menu displayed with a resource at the user device, wherein:

the resource is rendered according to first instructions provided by a provider of the resource;

an action trigger prompt is rendered to augment the resource with additional content not provided by the rendering of the resource according to the first instructions;

the action trigger menu is rendered at the user device with the resource and displayed with the resource in response to the selection of the action trigger prompt;

the action trigger menu facilitates an input, for a particular parameter, of a plurality of parameter values for an event; and the received data specifies a user defined event and an action associated with the user defined event and to be taken in response to the occurrence of the user defined event;

storing the data specifying the user defined event and the action to be taken in response to the occurrence of the user defined event in an action trigger data store;

based on the data stored in the action trigger data store, monitoring for the occurrence of the user defined event;

in response to the occurrence of the user defined event, determining a volatility of particular parameter, wherein the volatility is indicative of the frequency of change of a parameter value for the particular parameter;

in response to determining that the volatility is indicative of a infrequently changing parameter value, delaying performance of the action associated with the user defined event; and in response to determining that the volatility is indicative of a frequently changing parameter value that changes more often than the infrequently changing parameter value, delaying performance of the action, causing the action associated with the user defined event to be performed.

2. The method of claim 1, wherein the action trigger prompt is rendered according to second instructions that are separate from the resource and is rendered in an initial state and the user device displays the action trigger menu in response to a selection of the action trigger prompt by a user.

3. The method of claim 1, wherein the action trigger prompt includes an action selection menu that facilitates the selection of one of a plurality of actions.

4. The method of claim 1, wherein the action is a notification presentation to the user.

5. The method of claim 4, wherein delaying performance of the action associated with the user defined event comprises delaying the notification presentation until a user is available according to a user availability according to a user calendar.

6. The method of claim 1, wherein parameter values displayed in the action trigger menu are dependent on the parameters displayed on the resource.

7. A system, comprising:

a processor; and a non-transitory computer-readable medium coupled to the processor and having instructions stored thereon, which, when executed by the processor, cause the processor to perform operations comprising:

receiving, by a data processing apparatus and from a user device, data responsive to an action trigger menu displayed with a resource at the user device, wherein:

the resource is rendered according to first instructions provided by a provider of the resource;

an action trigger prompt is rendered to augment the resource with additional content not provided by the rendering of the resource according to the first instructions;

the action trigger menu is rendered at the user device with the resource and displayed with the resource in response to the selection of the action trigger prompt;

the action trigger menu facilitates an input, for a particular parameter, of a plurality of parameter values for an event; and the received data specifies a user defined event and an action associated with the user defined event and to be taken in response to the occurrence of the user defined event;

storing the data specifying the user defined event and the action to be taken in response to the occurrence of the user defined event in an action trigger data store;

based on the data stored in the action trigger data store, monitoring for the occurrence of the user defined event;

in response to the occurrence of the user defined event, determining a volatility of particular parameter, wherein the volatility is indicative of the frequency of change of a parameter value for the particular parameter;

in response to determining that the volatility is indicative of a infrequently changing parameter value, delaying performance of the action associated with the user defined event; and in response to determining that the volatility is indicative of a frequently changing parameter value that changes more often than the infrequently changing parameter value, delaying performance of the action, causing the action associated with the user defined event to be performed.

8. The system of claim 7, wherein the action trigger prompt is rendered according to second instructions that are separate from the resource and is rendered in an initial state and the user device displays the action trigger menu in response to a selection of the action trigger prompt by a user.

9. The system of claim 7, wherein the action trigger prompt includes an action selection menu that facilitates the selection of one of a plurality of actions.

10. The system of claim 7, wherein the action is a notification presentation to the user.

11. The system of claim 10, wherein delaying performance of the action associated with the user defined event comprises delaying the notification presentation until a user is available according to a user availability according to a user calendar.

12. The system of claim 7, wherein parameter values displayed in the action trigger menu are dependent on the parameters displayed on the resource.

13. A non-transitory computer-readable medium and having instructions stored thereon, which, when executed by a processor, cause the processor to perform operations comprising:

receiving, by a data processing apparatus and from a user device, data responsive to an action trigger menu displayed with a resource at the user device, wherein:

the resource is rendered according to first instructions provided by a provider of the resource;

an action trigger prompt is rendered to augment the resource with additional content not provided by the rendering of the resource according to the first instructions;

the action trigger menu is rendered at the user device with the resource and displayed with the resource in response to the selection of the action trigger prompt;

the action trigger menu facilitates an input, for a particular parameter, of a plurality of parameter values for an event; and the received data specifies a user defined event and an action associated with the user defined event and to be taken in response to the occurrence of the user defined event;

storing the data specifying the user defined event and the action to be taken in response to the occurrence of the user defined event in an action trigger data store;

based on the data stored in the action trigger data store, monitoring for the occurrence of the user defined event;

in response to the occurrence of the user defined event, determining a volatility of particular parameter, wherein the volatility is indicative of the frequency of change of a parameter value for the particular parameter;

in response to determining that the volatility is indicative of a infrequently changing parameter value, delaying performance of the action associated with the user defined event; and in response to determining that the volatility is indicative of a frequently changing parameter value that changes more often than the infrequently changing parameter value, delaying performance of the action, causing the action associated with the user defined event to be performed.

* * * * *